Patented May 18, 1954

2,678,903

UNITED STATES PATENT OFFICE 2,678,903

PRODUCTION OF ANTIBIOTICS

Clark C. Gapen, Riverside, Ill., and Robert W. Bond, Corpus Christi, Tex., assignors to Corn Products Refining Company, New York, N. Y., a corporation of New Jersey No Drawing. Application December 3, 1951, Serial No. 259,726

3 Claims. (Cl. 195—36)

This invention relates to improvements in the manufacture of antibiotics produced as a result of the growth of microorganisms, such as penicillin, streptomycin and aureomycin. More particularly it relates to the manufacture of such materials wherein corn (maize) steep liquor is used in the nutrient medium for the organisms producing these materials.

It is already known that corn steep liquor may be used in the nutrient medium for various mold produced antibiotics, such as penicillin, streptomycin, aureomycin, chlormycetin and terramycin. However, the yields of these materials obtained are not as high as desired nor are they always consistent, hence, there is a constant demand for culture media which will notably and consistently improve the yields of the aforementioned compounds.

We have discovered that when steepwater is used in the nutrient medium for the production of antibiotics, the yield of antibiotics can be markedly and consistently increased by incorporating in the steepwater any one or a combination of several fractions derived from the wet milling of corn.

The steeping and wet milling of corn are described by Kerr, Chemistry and Industry of Starch, 2nd edition, Academic Press, Inc., 1950, pages 38–61. The water drawn from the steeps after the steeping operation is known as "light" steepwater. "Light" steepwater is generally incubated (ibid., pages 39 and 40) to allow lactic acid formation therein and then evaporated to about 25° to about 30° Baumé and supplied to manufacturers of antibiotics in this form. The light steepwater which has been concentrated by evaporation is known as "heavy" steepwater. The steepwater may be evaporated without the incubation treatment and also used in culture media for the production of antibiotics. Corn steepwater has the following average analysis:

| Unincubated Steepwater | Incubated Steepwater |
|---|---|
| 50–58% of dry substance. Dry substance analysis: 12–20% lactic acid. 5–20% reducing sugars. 43–53% protein. 20–30% amino acids. pH 3.6–4.2. | 50–58% of dry substance. Dry substance analysis: 20–30% lactic acid. 0–7% reducing sugars. 43–53% protein. 20–30% amino acids. pH 3.6–4.2. |

The several fractions which we add to steepwater for purposes of the present invention are obtained from the gluten fraction of mill starch. After the mill starch stream is separated into a starch slurry and a gluten slurry, such as by means of tables or centrifuges, the gluten slurry is concentrated or partially dewatered in a centrifuge. The water effluent discharge from the centrifuge comprises one of the materials suitable for purposes of our invention. This material has the following average analysis:

0.3–0.7 oz. per gal. total solids
600–900 grains per gal. soluble materials

The solids will contain on a dry basis:

15–22% xanthophyll oil
55–40% protein
1.5–3.5% ash
2 to 10% starch

The water effluent discharge from the gluten concentrator may be added to the light steepwater prior to evaporation to heavy steepwater, or such effluent may be added directly to the heavy steepwater. However, if added to the latter it will dilute the heavy steepwater to a gravity below that usually considered desirable from the standpoint of keeping qualities of the steepwater and, therefore, it will be desirable to remove excess water from such steepwater if it is not to be used immediately in culture media. An alternate method of using the water effluent discharge from the gluten concentrator is to first allow it to settle, remove the settlings and add these to steepwater. They may be added to the light or heavy steepwater. Their composition will be the same as that of the effluent except the total solids content will be about 9 to 15 oz. per gallon.

The amount of effluent or settlings to be added to steepwater for purposes of the present invention should be about 1.6 to 27 per cent on a dry basis.

Another fraction which may be used for purposes of the present invention is also derived from the aforementioned water effluent. This effluent is in a foamy condition when it leaves the concentrator and contains a considerable amount of oil and insoluble material. In ordinary commercial practice a foam box is installed near the centrifuge whereby the foam can be collected and returned to the gluten stream to recover additional gluten. The foam from the foam box comprises another material suitable for purposes of our invention. The foam may be added to the light steepwater or to the heavy steepwater. The average analysis of the foam will be:

9–14 oz. per gal. of solids
300–800 grains per gal. of soluble material

The solids will contain on a dry basis:

15–60% xanthophyll oil
50–15% protein
0.5–1.5% ash
2 to 10% starch

The amount of foam fraction required to be added to steepwater to give the desired results should be about 0.8 to 27 per cent on a dry basis.

The following examples, which are given only as illustrations, describe various ways in which the invention may be carried out and the results achieved by them:

*Example I*

A culture medium was made from the following:

| | Gms. |
|---|---|
| Corn steepwater (heavy, containing 52% solids) to which had been added sufficient foam fraction containing 10 oz. of solids/gal. (the solids containing 40% xanthophyll oil) to provide 0.5 g. foam solids, dry basis | 40 |
| Lactose | 20 |
| Magnesium sulfate | 0.5 |
| Sodium nitrate | 1.0 |
| Zinc sulfate | 0.03 |
| Phenylacetamide | 1.0 |
| Water sufficient to make 1000 cc. | |

The pH of the mixture was adjusted to 5.5 with sodium carbonate and a 200 cc. portion thereof delivered into a 1000 cc. Erlenmeyer flask which was stoppered with cotton. The contents of the flask were sterilized for 20 minutes at 15 pounds' pressures. The contents of the flask were cooled to 25° C. and then inoculated with a 5 per cent germinated spore suspension of *Penicillium chrysogenum*. The flask was then shaken on an automatic shaker for 6 days, the temperature being maintained at 25° C.

After the fermentation had proceeded for about 40 hours the pH was ascertained. If it was non-acidic, i. e. pH 7.0 or over, 0.2 gm. of phenylacetic acid (penicillin G. precursor) was added to the flask and the fermentation continued until the sixth day after which the mycelium was separated from the beer by filtration. Part of the filtrate was diluted to 1–330 and the remainder to 1–500 and each was evaluated for number of penicillin units per 1 cc. by the standard cup assay method.

Five samples of media containing steepwater with added foam fraction gave the following results as compared to those containing untreated steepwater:

| Original Steepwater, Units/cc. | Original Steepwater Plus Foam Fraction, Units/cc. |
|---|---|
| 410 | 492 |
| 457 | 584 |
| 500 | 570 |
| 600 | 825 |
| 625 | 725 |

Samples of corn steepwater (containing about 52% solids) to which had been added settlings obtained from the water effluent discharge of the gluten concentrator were tested in the same manner as described in Example I. The settlings contained 10 oz. of solids per gallon and the solids contained about 20 per cent of xanthophyll oil. Sufficient settlings were added to the steepwater to provide 1 gm. of solids, dry basis, per 40 gm. sample used.

Three samples of media containing steepwater with added settlings gave the following results as compared to those containing untreated steepwater:

| Original Steepwater, Units/cc. | Original Steepwater Plus Settlings, Units/cc. |
|---|---|
| 625 | 850 |
| 600 | 780 |
| 600 | 720 |

We claim:

1. In a process for producing penicillin which comprises growing a penicillin producing mold in a nutrient medium containing corn steepwater, the improvement which comprises incorporating in said steepwater the solid contents of at least one fraction obtained from the wet milling of corn, from the group consisting of water effluent discharge from the glutent concentrator, settlings from such effluent, and the foam fraction from such effluent.

2. The method according to claim 1 wherein the amount of water effluent discharge, and settlings therefrom is 1.6 to 27 per cent on a dry basis and the amount of the foam fraction is 0.8 to 27 per cent on a dry basis.

3. Nutrient for penicillin producing molds, comprising corn steepwater in which has been incorporated the solids contents of at least one fraction, obtained from the wet milling of corn, from the group consisting of water effluent discharge from the gluten concentrator, settlings from such effluent, and the foam fraction from such effluent; said water effluent discharge, and settlings therefrom being employed in the amount of about 1.6 to 27 per cent on a dry basis, and said foam fraction being employed in the amount of about 0.8 to 27 per cent on a dry basis.

References Cited in the file of this patent

UNITED STATES PATENTS

| Number | Name | Date |
|---|---|---|
| 2,442,141 | Moyer | May 25, 1948 |
| 2,448,791 | Foster | Sept. 7, 1948 |
| 2,449,195 | Behrens et al. | Sept. 14, 1948 |
| 2,563,793 | Moyer | Aug. 7, 1951 |

OTHER REFERENCES

Liggett: Bacteriological Reviews, vol. 12, No. 4, December 1948, pages 297–311.